(12) United States Patent
Kishine et al.

(10) Patent No.: US 8,580,896 B2
(45) Date of Patent: Nov. 12, 2013

(54) PROCESS FOR PREPARING FLUORINE-CONTAINING POLYMER

(75) Inventors: Mitsuru Kishine, Settsu (JP); Masanori Kitaichi, Settsu (JP); Daisuke Ota, Settsu (JP); Masahiko Oka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 125 days.

(21) Appl. No.: 12/300,252

(22) PCT Filed: May 9, 2007

(86) PCT No.: PCT/JP2007/059605
§ 371 (c)(1),
(2), (4) Date: Nov. 10, 2008

(87) PCT Pub. No.: WO2007/129735
PCT Pub. Date: Nov. 15, 2007

(65) Prior Publication Data
US 2009/0215980 A1 Aug. 27, 2009

(30) Foreign Application Priority Data

May 10, 2006 (JP) .................. 2006-131562

(51) Int. Cl.
*C08F 2/22* (2006.01)
*C08F 2/44* (2006.01)
*C08F 214/18* (2006.01)
*C08F 259/08* (2006.01)

(52) U.S. Cl.
USPC ........... 525/276; 525/242; 525/243; 525/902; 526/242; 526/247

(58) Field of Classification Search
USPC ................. 524/773; 525/242, 243, 276, 902; 526/72, 242, 247
See application file for complete search history.

(56) References Cited

U.S. PATENT DOCUMENTS

| | | | |
|---|---|---|---|
| 4,391,940 A | 7/1983 | Kuhls et al. | |
| 5,506,281 A | 4/1996 | Muhlbauer | |
| 5,654,373 A | 8/1997 | Kruger et al. | |
| 5,869,577 A * | 2/1999 | Aihara et al. | 525/276 |
| 2007/0208131 A1 * | 9/2007 | Tsuda et al. | 524/544 |

FOREIGN PATENT DOCUMENTS

| | | |
|---|---|---|
| EP | 1 153 946 A1 | 11/2001 |
| EP | 1 489 113 A1 | 12/2004 |
| EP | 1 589 047 A1 | 10/2005 |
| EP | 1 736 487 A1 | 12/2006 |
| JP | 56-092943 A | 7/1981 |
| JP | 07-292033 A | 11/1995 |
| JP | 08-100033 A | 4/1996 |
| WO | 2005/097836 A1 | 10/2005 |

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

A process for preparing a fluorine-containing polymer which includes a first step for preparing a dispersion of fluorine-containing emulsified particles (A) having ionic functional groups where a fluorine-containing monomer mixture (i) is polymerized by using a water soluble radical polymerization initiator (a) without addition of an emulsifying agent, and a second step for preparing a fluorine-containing polymer (b) having a small amount of ionic functional groups where fluorine-containing monomers (ii) are emulsion-polymerized by using a radical polymerization initiator (b) in the presence of the fluorine-containing emulsified particles (A) having ionic functional groups without addition of an emulsifying agent.

10 Claims, 2 Drawing Sheets

PROCESS FOR PREPARING FLUORINE-CONTAINING POLYMER

TECHNICAL FIELD

The present invention relates to a novel process for preparing a fluorine-containing polymer.

BACKGROUND ART

In the case of preparing a fluorine-containing polymer by an emulsion polymerization method, a method of carrying out emulsion polymerization by using an emulsifying agent to stabilize a polymerization system and a method of carrying out emulsion polymerization by decreasing an amount of an emulsifying agent to a great extent or without using an emulsifying agent have been known for long.

The latter method is a method of carrying out emulsion polymerization without adding an emulsifying agent by utilizing conversion where a water soluble polymerization initiator such as ammonium persulfate (APS) used for emulsion polymerization acts so as to form an end group of the obtained fluorine-containing polymer into an ionic end group such as carboxyl (JP48-18957B).

In this emulsion polymerization method, a large amount of a water soluble polymerization initiator is added initially to produce, at an initial stage of the polymerization, a polymer having ionic functional group at its end at high concentration, and this polymer having ionic functional group at its end has an emulsifying action and functions, as a so-called polymer emulsifying agent, to attain an emulsified state of a polymerization system, namely, micelles are formed. Thereafter, as the polymerization proceeds, these micelles grow to become emulsified particles which further grow into larger particles. Such polymer emulsifying agent particles are produced one after another during proceeding of the polymerization, and therefore, even if growing of particles of polymer emulsifying agent proceeds at an initial stage of polymerization and an emulsifying action is lowered, the polymerization proceeds under stable emulsified state. This indicates that for carrying out emulsion polymerization stably, particles of polymer emulsifying agent need be newly produced as the polymerization proceeds. As a result, an obtained fluorine-containing polymer is obliged to become a fluorine-containing polymer having a lot of ionic ends.

Also, methods of carrying out emulsion polymerization of a fluorine-containing monomer by two steps are known (JP52-84271A and WO 96/17876). These polymerization methods do not aim at producing particles of polymer emulsifying agent, and an object thereof is to control the number of seed particles in a polymerization system before initiating desired emulsion polymerization (second step), or to stably disperse an oil soluble radical polymerization initiator to be used in the following step.

For example, in JP52-84271A, an elastic polymer at least containing vinylidene fluoride (VdF) is produced by two steps. In the first step, VdF and other fluorine-containing monomer are subjected to emulsion polymerization in the presence of a water soluble radical polymerization initiator, and after decomposition of the water soluble radical polymerization initiator is carried out if necessary, in the second step, emulsion polymerization is carried out using an oil soluble radical polymerization initiator. JP52-84271A discloses that in the emulsion polymerization of the first step, an obtained fluorine-containing copolymer functions as a dispersion stabilizer due to an action of hydrophilic group derived from the water soluble radical polymerization initiator, and therefore, no emulsifying agent (dispersion stabilizer) need be used in not only the first step but also the second step.

JP52-84271A says that an amount of the water soluble radical polymerization initiator used in the first step is 0.01 to 20% by mass, preferably 0.05 to 10% by mass based on the monomer used in the first step, but an amount thereof used in examples is at most up to 1.5% by mass based on the VdF copolymer to be obtained in the first step. In addition, though it is said that an amount of a VdF copolymer to be prepared in the first step is 1 to 80% by mass based on the VdF copolymer to be finally prepared, in examples, the amount is as high as not less than 5% by mass based on the finally obtained VdF copolymer.

Even under the conditions described in examples of JP52-84271A, emulsion polymerization of the first step and the second step can be surely carried out without using an emulsifying agent (dispersion stabilizer), and an aimed VdF copolymer can be prepared. However, a produced polymer is easily adhered on a wall surface of a polymerization reactor during polymerization, and use of an emulsifying agent cannot be avoided in order to solve this problem.

Also, WO 96/17876 indicates that in a two-staged emulsion polymerization method as described in JP52-84271A, by further decreasing an amount of a water soluble radical polymerization initiator used in the first step, an elastic fluorine-containing copolymer having well-balanced characteristics such as good flowability, vulcanization rate and physical properties of rubber is obtained.

In WO 96/17876, an amount of water soluble radical polymerization initiator used in the first step is so controlled as to be 0.001 to 0.003% by mass based on the total produced copolymer, and in example thereof, in the first step, in order to produce a fluorine-containing copolymer in an amount of 3 to 10% by mass based on the total produced copolymer, 0.0016 to 0.0022% by mass of water soluble radical polymerization initiator based on the fluorine-containing copolymer to be prepared in the first step is used. Though the amount of fluorine-containing copolymer to be prepared in the first step is decreased, an amount of water soluble radical polymerization initiator is greatly decreased, and a problem pointed out in JP52-84271A such as adhesion on a wall surface of a polymerization reactor is not solved.

In addition, JP2006-504844A discloses emulsion polymerization for preparing a fluorine-containing polymer in two steps without using an emulsifying agent. In the first step, emulsion polymerization of VdF with other fluorine-containing monomer or non-fluorine-containing monomer is carried out in the presence of a large amount of water soluble radical initiator to form fluoropolymer particles (field of polymerization) and prepare an emulsion. In the following second step, polymerization for preparing a fluorine-containing polymer is carried out successively without treatment of this emulsion. Since water soluble radical initiator is used in the first and second steps in an amount of not less than 1% by mass based on the finally obtained fluorine-containing copolymer, as mentioned above, the obtained fluorine-containing copolymer is obliged to have a lot of ionic ends. In addition, in JP2006-504844A, there is no description with respect to a problem with adhesion of produced polymer on a wall surface of a polymerization reactor as pointed out in JP52-84271A.

On the other hand, a so-called iodine transfer polymerization method, in which emulsion polymerization is carried out in the presence of an iodine compound, is known as a process for preparing a fluorine-containing rubber (JP53-125491A and WO 00/01741). In this iodine transfer polymerization method, generally emulsion polymerization is conducted using a small amount of water soluble radical polymerization initiator (for example, APS) in the presence of a fluorine-containing emulsifying agent comprising a perfluoro chain having about 4 to about 10 carbon atoms. An end of the fluorine-containing rubber obtained by an iodine transfer polymerization method is terminated with an iodine-containing group at high probability, and as a result, vulcanization characteristics and strength and compression set of a crosslinked article are improved. The reason for decreasing an amount of APS is that if the number of ionic functional groups (carboxyl groups) derived from APS is increased on ends of the obtained fluorine-containing rubber, an amount of end groups terminated with iodine-containing groups is decreased, and as a result, the above-mentioned excellent effects cannot be obtained. For the purpose of prevention of it, use of an emulsifying agent is necessary.

Accordingly, in an iodine transfer polymerization method, as described in JP48-18957B and JP2006-504844A, if a method of preparing a polymer emulsifying agent in situ is employed for decreasing an amount of an emulsifying agent used, since the number of carboxyl groups are increased as end groups of the obtained fluorine-containing rubber (a ratio of termination with iodine atoms is decreased), advantages of an iodine transfer polymerization method cannot be obtained.

As mentioned above, since it is important that an amount of ionic functional groups is not increased in an iodine transfer polymerization method, there have been no ideas of applying such a two-staged emulsion polymerization method as disclosed in JP52-84271A and WO 96/17876, in which many ionic functional groups are generated in the first step without using an emulsifying agent.

DISCLOSURE OF INVENTION

It is an object of the present invention to provide a process for preparing a fluorine-containing polymer having a small amount of ionic functional groups, in which polymerization proceeds stably without adhesion of produced polymer on wall surfaces of a polymerization reactor even if an emulsifying agent is not used.

Namely, the present invention relates to a process for preparing a fluorine-containing polymer comprising a first step for preparing a dispersion comprising fluorine-containing emulsified particles (A) having ionic functional groups where a fluorine-containing monomer mixture (i) is polymerized by using a water soluble radical polymerization initiator (a) with or without addition of an emulsifying agent, and a second step for preparing a fluorine-containing polymer (B) having a small amount of ionic functional groups where fluorine-containing monomers (ii) are emulsion-polymerized by using a radical polymerization initiator (b) in the presence of the fluorine-containing emulsified particles (A) having ionic functional groups with or without addition of an emulsifying agent, and the process is characterized in that:
(1) the fluorine-containing monomer mixture (i) used in the first step is a monomer mixture comprising a perhalo ethylenic monomer and a nonperhalo ethylenic monomer,
(2) the fluorine-containing emulsified particles (A) having ionic functional groups prepared in the first step are used in an amount of from 0.01 to 5.0% by mass based on the fluorine-containing polymer (B) to be prepared in the second step, and
(3) an amount of the water soluble radical polymerization initiator (a) used in the first step is from 0.01 to 1,000% by mass based on the fluorine-containing emulsified particles (A) having ionic functional groups to be prepared in the first step.

BEST MODE FOR CARRYING OUT THE INVENTION

Figure 1:
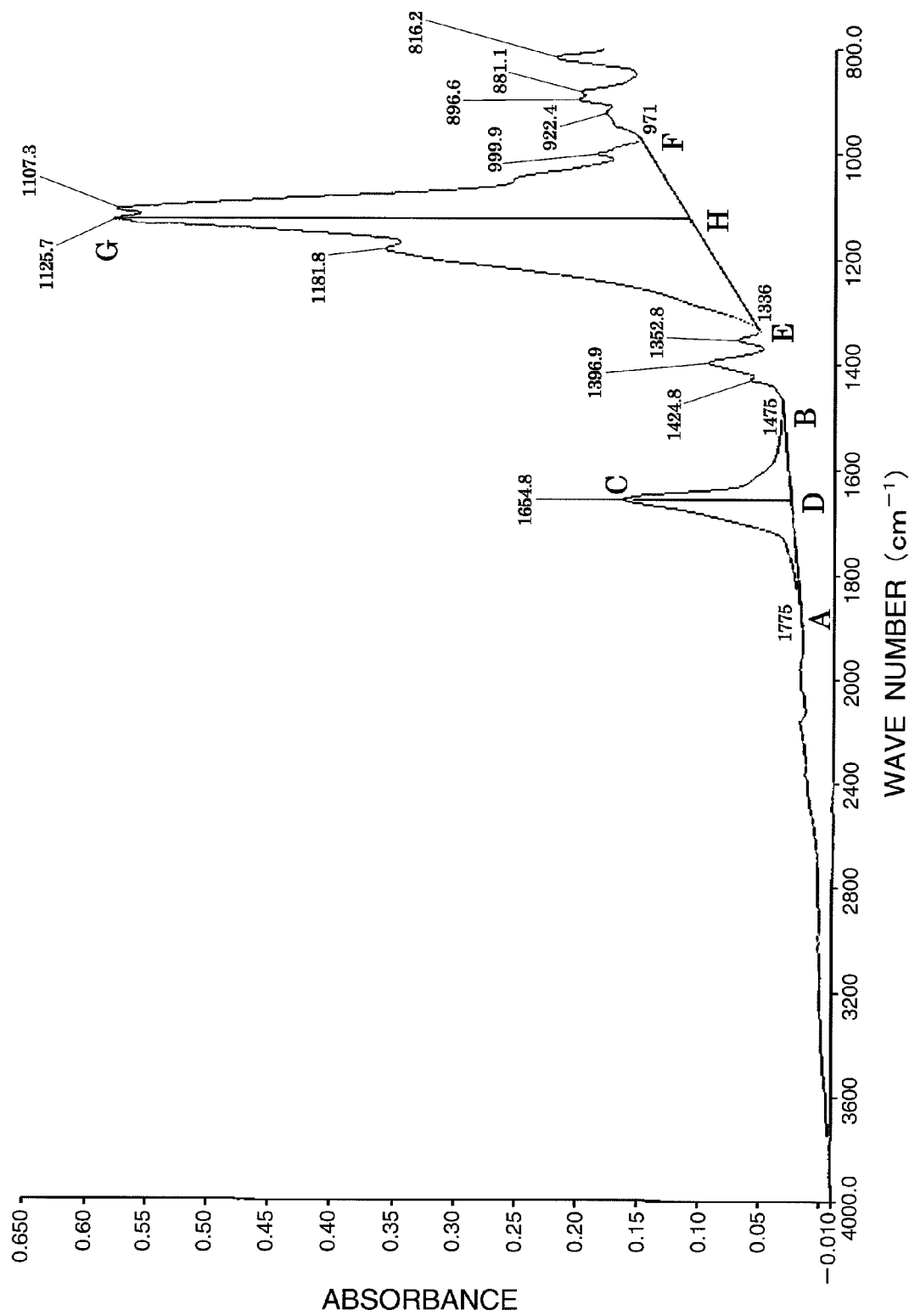
FIG. 1 IR-ATR spectrum of the fluorine-containing emulsified particles prepared in the first step of Example 1.

The process of the present invention for preparing a fluorine-containing polymer having a small amount of ionic functional groups comprises the first step for preparing a lot of fluorine-containing emulsified particles (A) having ionic functional groups and the second step for subjecting fluorine-containing monomer to emulsion polymerization in the presence of the fluorine-containing emulsified particles (A) having ionic functional groups.

Each step is then explained below.
First Step

In the first step, a dispersion comprising a lot of fluorine-containing emulsified particles (A) having ionic functional groups is prepared. As mentioned above, most important requirements for increasing the number of fluorine-containing emulsified particles (A) having ionic functional groups and improving emulsifying capability thereof are the following three requirements.
(Requirement 1)
The fluorine-containing monomer mixture (i) used in the first step is a monomer mixture comprising a perhalo ethylenic monomer and a nonperhalo ethylenic monomer.
(Requirement 2)
The fluorine-containing emulsified particles (A) having ionic functional groups prepared in the first step are used in an amount of from 0.01 to 5.0% by mass based on the fluorine-containing polymer (B) to be prepared in the second step.
(Requirement 3)
An amount of the water soluble radical polymerization initiator (a) used in the first step is from 0.01 to 1,000% by mass based on the fluorine-containing emulsified particles (A) having ionic functional groups to be prepared in the first step.

Each of these requirements is then explained below.
(Requirement 1)
The fluorine-containing monomer mixture (i) used in the first step is a monomer mixture comprising a perhalo ethylenic monomer and a nonperhalo ethylenic monomer.

In Requirement 1, a perhalo ethylenic monomer easily forms ionic functional groups such as carboxyl groups at polymer ends by radical polymerization. By using this monomer as a copolymerizing component, a lot of ends of —$CF_2COOH$ or —$CF(CF_3)COOH$ can be produced, thereby improving emulsifying capability. However, in the case of using only a perhalo ethylenic monomer, a hydrophobic group moiety is comprised of a perhalo alkylene chain, and therefore, the monomer mixture (i) thereof with a nonperhalo ethylenic monomer is used.

Examples of the perhalo ethylenic monomer are tetrafluoroethylene (TFE), hexafluoropropylene (HFP), chlorotrifluoroethylene (CTFE), perfluoro(alkyl vinyl ether) (PAVE) and the like. From the viewpoint that the ends of —$CF_2COOH$ or —$CF(CF_3)COOH$ can be produced much more, and copolymerizability is satisfactory, perfluoro ethylenic monomers such as TFE, HFP and perfluoro(methyl vinyl ether) (PMVE) are preferable.

A nonperhalo ethylenic monomer is used for the purpose of preparing the fluorine-containing emulsified particles (A)

having ionic functional groups and a shortened perhalo alkylene chain by copolymerization thereof.

Examples of a nonperhalo ethylenic monomer are fluorine-containing monomers such as VdF, trifluoroethylene, $CH_2=CHRf$ (Rf is a perfluoro alkyl group having 1 to 5 carbon atoms), $CF_2=CFCH_3$, $CH_2=CFCH_3$, $CHF=CFCH_3$, $CHF=CHCH_3$ and $CF_2=CHCH_3$; and non-fluorine-containing monomers such as ethylene and propylene. Especially from the viewpoint of satisfactory copolymerizability, VdF, ethylene and propylene are preferable.

A proportion of the perhalo ethylenic monomer in the monomer mixture used in the first step is not limited especially greatly, and from the viewpoint of efficiently producing fluorine-containing emulsified particles having ionic functional groups, the proportion is preferably not less than 20% by mole, further preferably not less than 50% by mole, especially preferably not less than 70% by mole. An upper limit thereof varies depending on kind of a perhalo ethylenic monomer and kind of a nonperhalo ethylenic monomer, and is usually 99% by mole, especially 95% by mole not to make a perhalo alkylene chain long.

Examples of preferable monomer combination are TFE/VdF (1 to 99/1 to 99 in a percent by mole ratio, hereinafter the same), HFP/VdF (1 to 90/10 to 99), TFE/HFP/VdF (1 to 98/1 to 90/1 to 98), PMVE/VdF (1 to 99/1 to 99), TFE/PMVE/VdF (1 to 98/1 to 98/1 to 98), CTFE/VdF (1 to 99/1 to 99), CTFE/VdF/TFE (1 to 98/1 to 98/1 to 98), TFE/ethylene (1 to 99/1 to 99), TFE/ethylene/PMVE (1 to 98/1 to 98/1 to 98), TFE/ethylene/HFP (1 to 98/1 to 98/1 to 90), TFE/propylene (1 to 99/1 to 99), and TFE/propylene/VdF (1 to 98/1 to 98/1 to 98), and especially TFE/VdF (20 to 95/5 to 80), HFP/VdF (1 to 90/10 to 99), and TFE/HFP/VdF (1 to 98/1 to 90/1 to 98) are preferable from the viewpoint of cost and satisfactory copolymerizability.

(Requirement 2)

The fluorine-containing emulsified particles (A) having ionic functional groups prepared in the first step are used in an amount of from 0.01 to 5.0% by mass based on the fluorine-containing polymer (B) to be prepared in the second step.

In the present invention, an object of the first step is to produce the fluorine-containing emulsified particles (A) having ionic functional groups in a necessary sufficient amount for stabilizing the following emulsion polymerization, but is not to prepare the fluorine-containing polymer (B) as a final product. Accordingly, an amount of the fluorine-containing emulsified particles (A) having ionic functional groups used in the second step is at most up to 5.0% by mass based on the fluorine-containing polymer (B). If the amount is too large, the number of ionic functional groups (carboxyl groups) of the fluorine-containing polymer (B) is increased too much, and for example, in a polyol vulcanization system of a fluorine-containing rubber using bisphenol AF as a crosslinking agent, a vulcanization rate is decreased, which is disadvantageous. In addition, if the amount is too small, since a necessary amount of fluorine-containing emulsified particles (A) having ionic functional groups is not obtainable, emulsion polymerization becomes unstable. An upper limit thereof is 3.0% by mass, further 1.0% by mass, especially 0.9% by mass based on the fluorine-containing polymer (B), and a lower limit is preferably 0.05% by mass, especially 0.1% by mass.

From different point of view, an amount of the fluorine-containing emulsified particles (A) having ionic functional groups used in the second step is preferably from 100 to 50,000 ppm, further preferably from 100 to 5,000 ppm based on an amount of polymerization water used in the first step, from the viewpoint of excellent stability of emulsified particles when polymerizing in the second step.

(Requirement 3)

An amount of the water soluble radical polymerization initiator (a) used in the first step is from 0.01 to 1,000% by mass based on the fluorine-containing emulsified particles (A) having ionic functional groups to be prepared in the first step.

As mentioned above, an object of the first step of the present invention is to produce the fluorine-containing emulsified particles (A) having ionic functional groups in an amount necessary and sufficient for stabilizing the following emulsion polymerization. Accordingly, it is necessary to produce sufficient number of fluorine-containing emulsified particles (A) having ionic functional groups, and for that purpose, it is necessary to increase a concentration of radicals becoming initiating points of the radical polymerization.

In the first step of the present invention, the water soluble radical polymerization initiator is used in a concentration higher than that of the water soluble radical polymerization initiator used in the first step of JP52-84271A and WO 96/17876. This concentration is the same as or higher than the initial concentration of the initiator used for generating a polymer emulsifying agent in JP48-18957B.

In the first step of the present invention, the amount of water soluble radical polymerization initiator (a) is at least not less than 0.01% by mass, further not less than 0.02% by mass, especially not less than 0.1% by mass based on the fluorine-containing emulsified particles (A) having ionic functional groups to be prepared in the first step. If the amount of the initiator is smaller than that mentioned above, necessary number of fluorine-containing emulsified particles (A) having ionic functional groups cannot be produced. An upper limit thereof is a concentration not inhibiting proceeding of the polymerization reaction, and is usually about 1,000% by mass, further about 100% by mass, especially about 50% by mass, further about 5% by mass.

From different point of view, an amount of water soluble radical polymerization initiator (a) used in the first step is preferably not less than 100 ppm, further preferably not less than 1,000 ppm based on polymerization water to be used in the first step from the viewpoint that necessary number of fluorine-containing emulsified particles (A) having ionic functional groups are easily produced. An upper limit thereof is about 20,000 ppm.

In the present invention, the polymerization is conducted under the conditions satisfying the above-mentioned requirements, and in order to further improve emulsifying capability of the fluorine-containing emulsified particles (A) having ionic functional groups, it is preferable to optionally employ the following requirements.

(Requirement 4)

A polymerization temperature higher than a polymerization temperature recommended for the water soluble radical polymerization initiator (a) to be used is adopted.

In the first step of the present invention, while the concentration of the water soluble radical polymerization initiator is increased (Requirement 3), when a polymerization temperature is made higher than a usual recommended polymerization temperature to accelerate decomposition of the radical polymerization initiator and generate a large amount of radicals, it contributes to further increase the concentration of radicals.

A preferable polymerization temperature in the first step of the present invention varies depending on kind of the water soluble radical polymerization initiator, kind of the fluorine-containing monomer and other polymerization conditions, and it is preferable to set at a temperature higher by 10° C. or more, further by 20° C. or more than the recommended polymerization temperature. An upper limit of the polymerization temperature is usually up to 150° C. It is a matter of course that the polymerization is conducted at a usual polymerization temperature.

For example, when APS is used as a water soluble radical polymerization initiator, a recommended polymerization temperature is from 50° to 130° C. However, in the present invention, it is preferable to employ a polymerization temperature within a range of not less than 70° C., preferably from 80° to 150° C., further preferably from 90° to 130° C.

In addition, when employing a redox polymerization initiator to be used together with a reducing agent, it is preferable to adopt a polymerization temperature within a range of not less than 5° C., preferably from 10° to 100° C., further preferably from 30° to 90° C.

(Requirement 5)

A lower polymerization pressure is adopted.

The polymerization pressure for the emulsion polymerization varies depending on vaporization pressure of the monomers to be used, and is optionally selected according to such conditions. The polymerization is usually conducted at a pressure of 0.5 to 7.0 MPa from the viewpoint of productivity and for making a molecular weight higher.

An object of the first step of the present invention is to produce fluorine-containing emulsified particles (A) having ionic functional groups in an amount necessary and sufficient for stabilizing the following emulsion polymerization, and therefore, it is not necessary to make a molecular weight of the fluorine-containing polymer higher. On the contrary, decrease in the number of molecules by making a molecular weight higher is not desirable because the number of fluorine-containing emulsified particles (A) having ionic functional groups is decreased.

In the present invention, since a large amount of water soluble radical polymerization initiator is used according to Requirement 3, it is easy to obtain necessary number of fluorine-containing emulsified particles (A) having ionic functional groups. In order to further increase the number of particles to improve emulsifying capability of the whole emulsified particles, it is preferable to decrease a polymerization pressure, thereby decreasing a molecular weight of the individual fluorine-containing emulsified particles (A) having ionic functional groups and increasing the number of molecules (the number of particles).

A preferable polymerization pressure varies depending on copolymerizability of monomers to be used and a combination thereof, and may be selected within a range from 0.05 to 3.0 MPa, further from 0.05 to 1.5 MPa, especially from 0.1 to 1.0 MPa. If the polymerization pressure is too low, polymerization does not proceed. It is a matter of course that a usual polymerization pressure, for example, 0.8 to 7.0 MPa may be adopted.

In the first step of the present invention, known initiators can be used as the water soluble radical polymerization initiator (a). Examples thereof are ammonium persulfate (APS), potassium persulfate (KPS), sodium persulfate and the like. Among these, APS and KPS can be suitably used from the viewpoint of satisfactory ability of generating ionic end groups.

In addition, it is possible to use a low temperature decomposition type initiator system using redox reaction by adding a reducing agent to the above-mentioned initiator according to necessity. Examples of preferable reducing agent are sulfites such as sodium sulfite and sodium hydrogensulfite, metabisulfites such as sodium hydrogensulfite and potassium hydrogensulfite, pyrosulfates and thiosulfates. When a sulfite is used, there is a case that ionic end group is $SO_3$.

In the process for preparing the fluorine-containing polymer of the present invention, it is preferable not to use an emulsifying agent throughout the first step and the second step. However, the use of an emulsifying agent is not excluded except an emulsifying agent having a specific problem from environmental point of view, for example, in order to further increase the number of fluorine-containing polymer particles in the first step or improve polymerization stability more in the second step.

Examples of usable emulsifying agents are, for instance, emulsifying agents of $RfCOONH_4$ (Rf is a perfluoroalkyl group having 3 to 6 carbon atoms) represented by $C_5F_{11}COONH_4$, emulsifying agents containing bis(perfluoroalkanesulfonyl)imide or salts thereof disclosed in JP2004-533511A, emulsifying agents represented by $CF_3(CF_2)_5CH_2CH_2SO_3M$ (M=$NH_4$ or H) disclosed in JP2004-509993A, emulsifying agents represented by $C_3F_7OCF(CF_3)COONH_4$ and $C_3F_7OCF(CF_3)CF_2OCF(CF_3)COONH_4$ disclosed in JP61-223007A, and the like. Among these, $CF_3(CF_2)_5CH_2CH_2SO_3M$ (M=$NH_4$ or H) and $C_3F_7OCF(CF_3)CF_2OCF(CF_3)COONH_4$ are preferable from the viewpoint of further increasing the number of fluorine-containing polymer emulsified particles in the first step, and $C_5F_{11}COONH_4$ is preferable from the viewpoint of improving polymerization stability in the second step. In addition, it is possible to use an emulsifying agent having a fluorine-containing vinyl group in the first step as explained infra.

When an emulsifying agent is used, the amount thereof is not limited especially, but it is desirable to inhibit the amount to the necessary minimum from environmental point of view. The amount is usually 10 to 10,000 ppm based on the amount of water to be used for the polymerization. In the case where a method of producing particles in a high concentration and then diluting as disclosed in WO 00/01741 can be employed, it is possible to use an emulsifying agent in an amount of 10,000 to 50,000 ppm.

It is preferable that a number average molecular weight of the fluorine-containing emulsified particles (A) having ionic functional groups prepared in the first step is as low as possible.

In addition, it is preferable that a proportion of the ionic functional groups in the fluorine-containing emulsified particles (A) having ionic functional groups obtained in the first step is as high as possible.

The proportion of the ionic functional groups means a proportion of an absorption of carboxyl group to an absorption of CF measured by IR method explained infra, and a content of ionic functional groups in the fluorine-containing polymer can be evaluated.

When judging a feature of the first step of the present invention from different point of view, in the case of using no emulsifying agent, an excellent emulsifying capability is exhibited when a difference $\Delta Sm1$ (=$Sm1_I - Sm1_F$) between the surface tension $Sm1_I$ of a polymerization system at an initial stage of polymerization (surface tension of polymerization water=73 mN/m) and the surface tension $Sm1_F$ of a polymerization system at the completion of the first step is within a range from −10 mN/m to −55 mN/m.

Namely, the surface tension of a polymerization system is decreasing as the fluorine-containing emulsified polymer having ionic functional groups is yielded, and it can be said that when the difference $\Delta Sm1$ is within the above-mentioned range, the fluorine-containing emulsified polymer having ionic functional groups was yielded in an amount sufficient for stably conducting emulsion polymerization of the second step. A preferable difference $\Delta Sm1$ is from $-10$ mN/m to $-55$ mN/m, further from $-20$ mN/m to $-55$ mN/m, especially from $-30$ mN/m to $-55$ mN/m.

When using an emulsifying agent, a difference between the surface tension of the polymerization system at an initial stage of the first step and the surface tension of the polymerization system at the completion of the first step becomes very small.

In the present invention, since a large amount of water soluble radical polymerization initiator (a) is used in the first step, it is preferable to include a step for reducing an amount of water soluble radical polymerization initiator (a) remaining in the polymerization system after the completion of the first step before entering into the second step so that the remaining water soluble radical polymerization initiator should not affect the polymerization in the second step. This step for reducing an amount of water soluble radical polymerization initiator (a) is carried out after completing the first step and before conducting the second step, and may be conducted there (in the vessel used in the first step) after completing the first step, may be conducted after taking out the emulsified particles and transferring them to an another vessel after the completion of the first step, or may be conducted after completing the first step and then transferring the emulsified polymer to the vessel used for the second step. In addition, this step for reducing an amount of water soluble radical polymerization initiator (a) may be conducted immediately after completing the first step.

For decreasing an amount of water soluble radical polymerization initiator (a), known means is employed. There can be employed, for example, a method of decomposing a polymerization initiator by treatment with activated carbon (JP52-84271A and WO 96/17876) and a method of decomposing a polymerization initiator by increasing temperature after releasing the fluorine-containing monomer mixture (i). In the case where the whole polymerization initiator was consumed in the first step, it is a matter of course that this step for reducing need not be conducted. Further, when the water soluble radical polymerization initiator is used in the following second step, it may remain at most in an amount necessary for the use.

Further, in order to accelerate a polymerization speed to increase the number of particles, it is preferable to include a step (pH adjusting step) for adjusting a pH of the dispersion to be within a range from 3 to 11 after the completion of the first step and before conducting the second step. This pH adjusting step is carried out after completing the first step and before conducting the second step, and may be conducted there (in the vessel used in the first step) after completing the first step, may be conducted after taking out the dispersion and transferring it to an another vessel after the completion of the first step, or may be conducted after completing the first step and then transferring the dispersion to the vessel used for the second step.

The pH regulator is not limited particularly, and examples thereof are aqueous ammonia, sodium hydroxide, potassium hydroxide, ammonium hydroxide, sodium carbonate, potassium carbonate, sodium hydrogencarbonate, potassium hydrogencarbonate, disodium hydrogenphosphate, dipotassium hydrogenphosphate, sodium phosphate, potassium phosphate, sodium tetraborate, potassium citrate, potassium dihydrogen citrate, sodium acetate, phosphoric acid, acetic acid, boric acid and citric acid.

A pH of the dispersion is adjusted to preferably 3 to 11, further preferably 4 to 7 from the viewpoint of improvement in polymerization speed and increase in the number of particles in the second step.

When a lot of fluorine-containing emulsified particles (A) having ionic functional groups can be prepared in the first step, it is very important to dilute them before the use for the polymerization of the second step, from the viewpoint of improvement in productivity. In the case of dilution, it is necessary that there are sufficient number of particles after the completion of the first step (approximately to such an extent that the number of particles is about $10^{13}$/ml after the dilution, namely, when initiating the second step). As mentioned above, there is a case where addition of a proper emulsifying agent is preferable for increasing the number of particles. In that case, it is suitable to use in combination therewith a compound having a fluorine-containing vinyl group represented by $CH_2$=$CFCF_2O(CF(CF_3)CF_2O)_a$—$CF(CF_3)Y$ (in the formula, a represents 0 or an integer of 1 to 10, Y represents —$SO_3M$ or COOM, M represents H, $NH_4$ or alkali metal) disclosed in WO 2005/097836.

In addition, in order to decrease the molecular weight of the polymer obtained in the first step, a known chain transfer agent, for example, isopentane, diethyl malonate or the like may be used. However, when a chain transfer agent is used, it is desirable that the chain transfer agent is used in an amount not to cause reduction of the molecular weight and decrease in an end blocking ratio in the polymerization of the second step, or is removed from the system after the completion of the first step.

Second Step

In the second step of the present invention, the fluorine-containing polymer (B) having a small amount of ionic functional groups is prepared by emulsion polymerization of the fluorine-containing monomer (ii) in the presence of the fluorine-containing emulsified particles (A) having ionic functional groups prepared in the first step by using the radical polymerization initiator (b) with or without addition of an emulsifying agent.

Basically, the polymerization of the second step proceeds sufficiently stably by using the emulsion of the fluorine-containing emulsified particles (A) having ionic functional groups prepared in the first step, and therefore, no emulsifying agent need be used. However, in the case where an emulsified state of the fluorine-containing polymer prepared in the second step is unstable, or in the case where a concentration of the polymer in the emulsion is desired to be increased, a known emulsifying agent may be used for the purpose of improving emulsification stability in an amount necessary for the purpose. Examples of an allowable emulsifying agent are those exemplified supra.

This emulsion polymerization of the second step does not differ specifically from an emulsion polymerization using an emulsifying agent except that the emulsion polymerization is carried out in the emulsion of the fluorine-containing emulsified particles (A) having ionic functional groups prepared in the first step. Since an object of the emulsion polymerization of the second step is to make the molecular weight higher, it is desirable that the amount of the polymerization initiator used in the second step is as small as 0.01 to 0.5% by mass, especially 0.05 to 0.2% by mass based on the fluorine-containing polymer (B) to be prepared in the second step.

The radical polymerization initiator (b) used in the second step may be a water soluble radical polymerization initiator (b1) or an oil soluble radical polymerization initiator (b2).

Examples of the water soluble radical polymerization initiator (b1) and preferable examples thereof are those raised in the first step.

There can be used known initiators as the oil soluble radical polymerization initiator (b2) depending on the method of polymerization explained infra. Examples are oil soluble radical polymerization initiators disclosed in WO 96/17876, for example, diisopropyl peroxydicarbonate (IPP) and n-propyl peroxydicarbonate (NPP). Among these, IPP is preferable from the viewpoint of satisfactory capability as an initiator.

Among these initiators, the water soluble radical polymerization initiators (b1) are preferable from the viewpoint of satisfactory stability of the emulsified particles in the polymerization.

The fluorine-containing monomers (ii) used (polymerized) in the second step are not limited particularly as far as they are fluorine-containing monomers, and may be used alone or may be used in the form of monomer mixture. In addition, a monomer combination of the monomer mixture used in the first step may be the same as or different from that of the fluorine-containing monomers used in the second step.

Examples of the fluorine-containing monomers (ii) are the same monomers as those exemplified as the monomers to be used in the first step, for example, VdF, TFE, HFP, PAVE and CTFE. These monomers may be used alone or may be used in combination of two or more thereof.

Further, a non-fluorine-containing monomer may be used together. Examples of such a non-fluorine-containing monomer are, for instance, ethylene and propylene.

The amount of ionic functional groups of the fluorine-containing polymer (B) obtained in the second step is small. When the ionic functional group of the fluorine-containing polymer (B) obtained in the second step is carboxyl, a proportion of the ionic functional groups of the fluorine-containing polymer (B) is very small.

For the polymerization of the second step, various polymerization methods used for polymerization of fluorine-containing monomers can be employed as far as the polymerization is conducted by emulsion polymerization, and the polymerization method of the second step is effective in a polymerization system using no emulsifying agent especially in the case where the amount of ionic functional groups at polymer ends is decreased, namely, in the case where the amount of radical initiator must be decreased extremely. For example, in the case of high pressure polymerization method (2.5 to 6.0 MPa) disclosed in WO 2004/009647, if a large amount of initiator is added, control of polymerization becomes difficult. Accordingly, the polymerization must be conducted with a small amount of initiator. However, in the case of a small amount of initiator, a polymer having ends of ionic functional groups is hardly produced and emulsification stability cannot be obtained, thus actually making polymerization impossible. In addition, in an iodine transfer polymerization method, since polymerization must be conducted with a smaller amount of initiator in order to further increase an end blocking ratio of the polymer, there arises the same problem as in the above-mentioned high pressure polymerization method. However, this problem can be solved by conducting polymerization for preparing a polymer having ends of ionic functional groups, namely, a polymer emulsifying agent by using a large amount of water soluble radical initiator in the first step and then, after reducing an amount of a remaining radical initiator, conducting polymerization for preparing a desired copolymer in the second step.

In the process for preparing the fluorine-containing polymer of the present invention, each step may be conducted batchwise or continuously in a single polymerization reactor, or the first step and the second step may be carried out in separate polymerization reactors. In addition, in the case of conducting a step for reducing a water soluble radical polymerization initiator and a pH adjusting step after the completion of the first step, these steps may be conducted in the same polymerization reactor as in the first step or in a separate reactor. Further, these steps may be conducted continuously by connecting a plurality of reactors.

The fluorine-containing polymer (B) having a small amount of ionic functional groups which is obtained by the preparation process of the present invention may be elastomeric (fluorine-containing rubber) or may be resinous (fluorine-containing resin), or may be for a molding material or a coating composition.

The fluorine-containing rubber may be an iodine-containing fluororubber end-capped with iodine. The process of the present invention can be suitably used for preparation of polyol-vulcanizable fluororubber, in which it is considered that mold-processability and vulcanization characteristics are inhibited by ionic ends.

EXAMPLES

The present invention is then explained by means of examples, but the present invention is not limited to them.

Methods of measuring and evaluating characteristics which are used herein are as follows.

(1) NMR

Measuring equipment: available from BRUKER

Measuring conditions of $^1$H-NMR: 300 MHz (tetramethylsilane=0 ppm)

Measuring conditions of $^{19}$F-NMR: 282 MHz (trichlorofluoromethane=0 ppm)

(2) Number Average (Weight Average) Molecular Weight

A number (weight) average molecular weight is calculated from the data measured with gel permeation chromatography (GPC) by using GPC HLC-8020 available from TOSO CORPORATION and columns available from SHOWA DENKO K.K. (one GPC KF-801, one GPC KF-802 and two GPC KF-806M were connected in series) and flowing tetrahydrofuran (THF) as a solvent at a flowing rate of 1 ml/min.

(3) Average Particle Size

Measuring equipment: MICROTRAC UPA available from Honeywell

Measuring method: Dynamic light scattering method 0.05 ml of an emulsion for measurement is diluted with 8 ml of pure water to make a sample, and measurement is conducted at room temperature. An average diameter of the obtained data is assumed to be a particle size.

(4) Surface Tension

Measuring equipment: FACE CBVP type surface tension balance model CBVP-A3 available from Kyowa Interface Science Co., Ltd.

Measuring condition: Plate method, 23° C.

Preparation of Sample: the Obtained Dispersion or Emulsion is Used as it is for measurement.

(5) Proportion of Carboxyl Content

Measuring equipment: Enhanced Intensity FT-IR Spectrometer FTS 575C (available from Bio-Rad Laboratories Co., Ltd.)

Measuring conditions: Number of reflections; once, Incident angle; 45°,

IR internal reflection element; Diamond

Production of sample: To the dispersion comprising the fluorine-containing emulsified particles (A) having ionic functional groups was added dropwise 1% by mass aqueous solution of potassium hydroxide to adjust a pH to 7 to 8, followed by drying at 50° C. for 24 hours in an electric oven equipped with a damper and subsequently drying at 80° C. for 24 hours in an electric oven for vacuum drying to remove moisture. In this case, it is recommendable to use, for example, a wide neck glass vessel having a diameter of 20 cm so that the emulsion is easily dried. When the polymer obtained by drying is a solid, it is pulverized in a mortar, and in the case of a liquid, IR-ATR spectrum is measured in a liquid state. In the case of a solid, if a degree of drying is insufficient, it is hardly pulverized, and therefore, it is recommendable to extend a drying time. In both cases of a solid and a liquid, if the drying is insufficient and water is contained, an absorption of water is seen around 1,650 cm$^{-1}$ and 3,350 cm$^{-1}$, and since there is a possibility that an absorption of water especially around 1,650 cm$^{-1}$ may overlap with an absorption of carbonyl group, attention must be paid to it. With respect to the obtained IR spectrum, a ratio $I_{COOK}/I_{CF}$ of a maximum height $I_{COOK}$ of an absorption of carbonyl group to a maximum height $I_{CF}$ of an absorption of CF is assumed to be a proportion of carboxyl content.

(6) Vulcanization Characteristics, Mechanical Properties and Compression Set of Vulcanized Article
<Additives>
Additives used are as follows.
N990 (carbon black): THERMAX MT (available from Cancarb Co., Ltd.)
Peroxide vulcanization accelerator: Triallylisocyanurate (TAIC) (available from Nippon Chemical Industries Co., Ltd.)
Peroxide vulcanizing agent: PERHEXA 25B (available from NOF Corporation)
MgO: KYOWAMAG 150 (available from Kyowa Chemical Industries, Co., Ltd.)
Ca(OH)$_2$: CALDIC 2000 (available from Ohmi Chemical Industry Co., Ltd.)
<Vulcanization characteristics>
When vulcanizing the fluorine-containing copolymer composition prepared in example, vulcanization curves at 160° C. and 170° C. are made using model JSR CURASTOMETER, and minimum viscosity (ML), degree of vulcanization (MH), induction time (T$_{10}$), optimum vulcanization time (T$_{50}$) and optimum vulcanization time (T$_{90}$) are determined.
<100% Modulus, Tensile Strength at Break, Tensile Elongation at Break>
The fluorine-containing copolymer composition for vulcanization prepared in example is subjected to compression molding with a hot press to form into a 2 mm thick sheet, and 100% modulus, tensile strength at break, and tensile elongation at break are measured according to JIS-K6251. A test piece is in the form of dumbbell No. 4.
<Hardness>
The fluorine-containing copolymer composition for vulcanization prepared in example is subjected to compression molding with a hot press to form into a 2 mm thick sheet-like test piece, and hardness is measured according to JIS-K6253.
<Compression Set>
The fluorine-containing copolymer composition for vulcanization prepared in example is subjected to compression molding with a hot press to make an O ring (P24) having a wire diameter of 3.5 mm which is then subjected to compression by 25%, and compression set (CS) is determined under the conditions of 200° C. for 72 hours according to JIS-K6262.

Example 1

(First Step)
Into a 6-liter stainless steel autoclave were poured 3.0 liter of pure water and 8.0 g of disodium hydrogenphosphate 12-water, and the inside of the autoclave was sufficiently replaced by nitrogen gas. After heating up to 94° C. with stirring at 600 rpm, a pressurized monomer mixture comprising vinylidene fluoride (VdF), tetrafluoroethylene (TFE) and hexafluoropropylene (HFP) (Jul. 20, 1973 in percent by mole ratio) was introduced so that the pressure inside the system would become 0.21 MPa. Then, a solution of polymerization initiator prepared by dissolving 2 g of ammonium persulfate (APS) in 5.5 ml of pure water was introduced with pressurized nitrogen gas to initiate reaction.

As the polymerization proceeded, when the inside pressure decreased to 0.19 MPa, a pressurized monomer mixture of VdF/TFE/HFP (31/36/33 in a percent by mole ratio) was introduced until the inside pressure reached 0.21 MPa. Thereafter, as polymerization reaction proceeded, pressurized monomer mixture was introduced in the same manner as above, and increase and decrease of pressure were repeated five times between 0.19 MPa and 0.21 MPa.

When the total amount of introduced monomer mixture reached 15 g, the stirring was stopped and the monomer mixture remaining in the polymerization reactor was discharged to stop the reaction. Then, the autoclave was cooled to room temperature, and 3,030 g of a dispersion containing fluorine-containing emulsified particles (A) having ionic functional groups (hereinafter may be simply referred to as dispersion) was obtained.

The polymerization time required for the first step was 1.7 hours. The solid content of this dispersion was 0.6% by mass.

The surface tension Sm1$_F$ of the obtained dispersion was 36 mN/m, and a difference ΔSm1 from the initial surface tension Sm1$_I$ was −36 mN/m.

IR-ATR spectrum of the fluorine-containing emulsified particles having carboxyl group in the dispersion is as shown in FIG. 1. A ratio of carboxyl content ($I_{COOK}/I_{CF}$) calculated by the following method using this spectrum was 0.29.

A base line of an absorption (1,655 cm$^{-1}$) of carbonyl group of —COOK is set as shown in FIG. 1. Namely, a line AB is drawn. Next, a line is drawn in a vertical direction from the maximum height C of this absorption, and an intersection point of this vertical line and the line AB is represented by D. The length of the line CD is assumed to be $I_{COOK}$ ($I_{COOK}$=0.136). In the same manner as above, a base line EF of an absorption (1,126 cm$^{-1}$) of CF is drawn, and a line is drawn in a vertical direction from the maximum height G of this peak, and an intersection point of this vertical line and the line EF is represented by H. The length of the line GH is assumed to be $I_{CF}$ ($I_{CF}$=0.471). $I_{COOK}/I_{CF}$ is calculated from the obtained values.

Since fluorine-containing emulsified particles having carboxyl group in the dispersion did not dissolve in THF, a molecular weight thereof could not be measured by GPC.
(Step for Reducing Polymerization Initiator)
The emulsion prepared in the first step, after discharging of the monomer mixture was subjected to replacing by nitrogen gas in vacuo, compression at 0.02 MPa and heating at 94° C. for 2.5 hours to completely decompose APS remaining in the emulsion.
(Second Step)
After charging 2,000 g of dispersion subjected to the step for reducing polymerization initiator into a 6-liter stainless steel autoclave, the inside of a system was replaced by nitrogen gas. The autoclave was heated up to 80° C. with stirring at 600 rpm, and a pressurized monomer mixture of VdF/TFE/HFP (=22/11/67 in a percent by mole ratio) was introduced so that the inside pressure would become 1.55 MPa. Then, a solution of polymerization initiator prepared by dissolving 47 mg of APS in 10 ml of pure water was introduced with pressurized nitrogen gas to initiate reaction.

As the polymerization proceeded, when the inside pressure decreased to 1.45 MPa, a pressurized monomer mixture of VdF/TFE/HFP (50/20/30 in a percent by mole ratio) was introduced until the inside pressure reached 1.55 MPa. Then, 3.06 g of pressurized 1,4-diiodoperfluorobutane was introduced. Thereafter, as the polymerization reaction proceeded, only a pressurized monomer mixture was introduced in the same manner as above, and increase and decrease of pressure were repeated between 1.45 MPa and 1.55 MPa. In addition, 47 mg of pressurized APS was introduced 3, 6 and 9 hours, respectively after starting of the polymerization.

When the total amount of introduced monomer mixture reached 664 g, the autoclave was cooled to room temperature, and the monomer mixture was discharged, and the reaction was stopped to obtain 2,627 g of an emulsion of fluorine-containing polymer (B) having a smaller amount of ionic functional groups (hereinafter may be simply referred to as an emulsion). The polymerization time required for the second step was ten hours.

The surface tension of the obtained emulsion was 67 mN/m, the solid content was 23.5% by mass, and the weight of fluorine-containing copolymer obtained throughout the first step and the second step was 617 g. The average particle size of the fluorine-containing copolymer particles was 172 nm.

Figure 2:
FIG. 2 IR-ATR spectrum of the fluorine-containing copolymer prepared in the second step of Example 1.

IR-ATR spectrum of the fluorine-containing copolymer in this emulsion is one shown in FIG. 2. A ratio of carboxyl content ($I_{COOK'}/I_{CF'}$) calculated by the following method using this spectrum was 0.02, which indicates that the carboxyl content was reduced.

A base line of an absorption (1,660 cm$^{-1}$) of carbonyl group of –COOK is set as shown in FIG. 2. Namely, a line IJ is drawn. Next, a line is drawn in a vertical direction from the maximum height K of this absorption, and an intersection point of this vertical line and the line IJ is represented by L. The length of the line KL is assumed to be $I_{COOK'}$ ($I_{COOK'}=0.01$). In the same manner as above, a base line MN of an absorption (1,129 cm$^{-1}$) of CF is drawn, and a line is drawn in a vertical direction from the maximum height O of this peak, and an intersection point of this vertical line and the line MN is represented by P. The length of the line OP is assumed to be $I_{CF'}$ ($I_{CF'}=0.572$). $I_{COOK'}/I_{CF'}$ is calculated from the obtained values.

This emulsion was taken out from the autoclave, and a weight of the polymer adhering to the side walls of the autoclave was measured. The weight was as small as 0.23 g.

Then, to the emulsion taken out from the autoclave was added a 27% aqueous solution of $Al_2(SO_4)_3$ for coagulation, followed by washing with water and drying at 80° C. for six hours and then drying at 120° C. for twelve hours to collect the fluorine-containing copolymer. According to NMR analysis, the copolymer was one comprising VdF, TFE and HFP in a percent by mole ratio of 53/22/25. A Mooney viscosity ML(1+10) of the dried fluorine-containing copolymer was 56 at 100° C.

According to measurement by GPC, a number average molecular weight Mn of the fluorine-containing copolymer was 8.1×10$^4$, its weight average molecular weight Mw was 1.2×10$^5$, and its molecular weight distribution Mw/Mn was 1.5.

In this example, calculated weight of fluorine-containing emulsified particles (A) having carboxyl group prepared in the first step is 1.9% by mass based on the weight of finally obtained fluorine-containing copolymer (B) (The weight of the obtained fluorine-containing copolymer (B) is 617 g. The weight of the emulsified particles is 2,000 g×0.006=12 g. From these, the proportion of the emulsified particles is 12 g/617 g×100=1.9% by mass. The emulsified particles mean those other than water which are contained in the fluorine-containing dispersion having ionic functional groups.).

To 100 phr of the obtained fluorine-containing copolymer were kneaded 20 phr of N990, 4 phr of TAIC and 1.5 phr of PERHEXA 25B with a mixing roll, and a composition for vulcanization was obtained. Vulcanization characteristics (CURASTOMETER V available from JSR Co., Ltd.) and physical properties after press vulcanization and then oven vulcanization are as shown in Table 1, and satisfactory characteristics were exhibited.

TABLE 1

|  | Unit | Example 1 |
|---|---|---|
| Fluorine-containing copolymer prepared in Example 1 | parts by weight | 100 |
| N990 | parts by weight | 20 |
| TAIC | parts by weight | 4 |
| PERHEXA 25B | parts by weight | 1.5 |
| Vulcanization characteristics |  |  |
| Vulcanization temperature | ° C. | 160 |
| Minimum viscosity (ML) | Kgfcm | 0.58 |
| Degree of vulcanization (MH) | Kgfcm | 18.5 |
| Induction time (T$_{10}$) | min | 1.3 |
| Optimum vulcanization time (T$_{50}$) | min | 2.2 |
| Optimum vulcanization time (T$_{90}$) | min | 3.7 |
| Vulcanization conditions |  |  |
| Press vulcanization | — | 160° C. × 10 minutes |
| Oven vulcanization | — | 180° C. × 4 hours |
| Mechanical properties |  |  |
| 100% modulus (M100) | MPa | 2.8 |
| Tensile strength at break (TB) | MPa | 20.5 |
| Tensile elongation at break (EB) | % | 325 |
| Hardness (Shore A, peak value) | — | 71 |
| Hardness (Shore A, 1 sec) | — | 68 |
| Compression set (CS) |  |  |
| Conditions: 200° C. × 72 hours | % | 27.1 |

Examples 2 to 5

(First Step)

Polymerization was carried out to obtain fluorine-containing emulsified particles (A) having ionic functional groups in the same manner as in Example 1 by changing an amount of polymerization initiator APS and a polymerization pressure as shown in Table 2. Increase and decrease in pressure were repeated within a range of ±0.01 MPa of the polymerization pressure. Table 2 shows polymerization conditions and results of the first step, namely, an amount of APS, pressure, a total amount of introduced monomer mixture, polymerization time, yield, solid content and a proportion of carboxyl content.

(Step for Reducing Polymerization Initiator)

The same treatment as in Example 1 was conducted.

(Second Step)

After charging 169 g each of dispersions subjected to the step for reducing polymerization initiator into a 0.5-liter stainless steel autoclave, the inside of a system was replaced by nitrogen gas. The autoclave was heated up to 80° C. with stirring at 875 rpm, and a pressurized monomer mixture of VdF/TFE/HFP (=22/11/67 in a percent by mole ratio) was introduced so that the inside pressure would become 1.55 MPa. Then, 1 g of 3.9% by mass aqueous solution of APS was introduced with pressurized nitrogen gas to initiate reaction.

As the polymerization proceeded, when the inside pressure decreased to 1.45 MPa, a pressurized monomer mixture of VdF/TFE/HFP (50/20/30 in a percent by mole ratio) was introduced until the inside pressure reached 1.55 MPa. Then, 0.255 g of pressurized 1,4-diiodoperfluorobutane was introduced. Thereafter, as polymerization reaction proceeded, only the monomer mixture was introduced in the same manner as above, and increase and decrease of pressure were repeated between 1.45 MPa and 1.55 MPa. When a rate of polymerization reaction is low, 1 g of 3.9% by mass aqueous solution of APS was introduced under pressure three hours after starting of the polymerization.

When the total amount of introduced monomer mixture reached 57 to 65 g, the autoclave was cooled to room temperature, and the monomer mixture was discharged, and the reaction was stopped to obtain each emulsion. Table 2 shows the polymerization conditions and results of the second step, namely, whether treatment of the dispersion is conducted or not, a total amount of APS added, a total amount of introduced monomer mixture, polymerization time, yield, solid content, an average particle size of polymer and a state of polymer adhered to side walls of the autoclave (hereinafter may be referred to as degree of polymer adhesion). The degree of polymer adhesion is defined and evaluated as follows.

3: Polymer is not adhered to a stirrer blade, stirrer shaft, and side walls and bottom of polymerization reactor.
2: Polymer is slightly adhered to a stirrer blade, stirrer shaft, and side walls and bottom of polymerization reactor.
1: Polymer is remarkably adhered to a stirrer blade, stirrer shaft, and side walls and bottom of polymerization reactor.

In Example 3-2, polymerization for obtaining the fluorine-containing polymer (B) was conducted after diluting the obtained dispersion to half with pure water. In Example 4-2, polymerization for obtaining the fluorine-containing polymer (B) was conducted after adjusting a pH of the obtained dispersion to 7 with 27% by mass aqueous ammonia.

TABLE 2

|  | Unit | Ex. 1 | Ex. 2 | Ex. 3-1 | Ex. 3-2 | Ex. 4-1 | Ex. 4-2 | Ex. 5 |
| --- | --- | --- | --- | --- | --- | --- | --- | --- |
| First step | | | | | | | | |
| Pressure | MPa | 0.20 | 0.20 | | 0.20 | | 0.20 | 0.50 |
| Amount of APS added | g | 2.0 | 0.2 | | 1.0 | | 4.0 | 2.0 |
| Total amount of monomer mixture | g | 15 | 13 | | 15 | | 15 | 17 |
| Polymerization time | h | 1.7 | 2.7 | | 1.7 | | 1.7 | 0.5 |
| Yield | g | 3,030 | 3,024 | | 3,027 | | 3,031 | 3,030 |
| Solid content | % by weight | 0.6 | 0.5 | | 0.5 | | 0.5 | 0.6 |
| Proportion of carboxyl content | — | 0.29 | 0.18 | | 0.23 | | 0.48 | 0.28 |
| Second step | | | | | | | | |
| Dilution step with pure water (dilution of original solution with 50% by mass of pure water) | — | None | None | None | Conducted | None | None | None |
| Neutralizing step with aqueous ammonia | — | None | None | None | None | None | Conducted | None |
| Total amount of initiator added | mg | 78 | 39 | 39 | 78 | 78 | 39 | 78 |
| Total amount of monomer mixture | g | 60 | 63 | 64 | 65 | 62 | 57 | 62 |
| Polymerization time | h | 4.2 | 3.6 | 3.2 | 3.9 | 4.9 | 4.5 | 4.2 |
| Yield | g | 229 | 232 | 233 | 231 | 231 | 226 | 231 |
| Solid content | % by mass | 23.5 | 26.0 | 27.2 | 25.0 | 26.4 | 23.7 | 24.2 |
| Average particle size of polymer | nm | 172 | 197 | 171 | 210 | 315 | 123 | 178 |
| Degree of polymer adhesion | — | 3 | 2 | 3 | 2 | 3 | 3 | 3 |

Example 6

(First Step)

Polymerization for preparing fluorine-containing emulsified particles (A) having ionic functional groups was carried out under the same conditions as in Example 1 except that 6.0 g of 50% aqueous solution of emulsifying agent $CH_2=CFCF_2OCF(CF_3)CF_2OCF(CF_3)COONH_4$ was added. The results are shown in Table 3. A step for reducing polymerization initiator and a second step were carried out in the same manner as in Examples 2 to 5. The results are shown in Table 3.

TABLE 3

|  | Unit | Ex. 1 | Ex. 6 |
| --- | --- | --- | --- |
| First step | | | |
| Pressure | MPa | 0.20 | 0.20 |
| Amount of 50% aqueous solution of $CH2=CFCF_2OCF(CF_3)CF_2OCF(CF_3)COONH_4$ | g | — | 6.0 |
| Amount of APS | g | 2.0 | 2.0 |
| Total amount of monomer mixture | g | 15 | 15 |

TABLE 3-continued

|  | Unit | Ex. 1 | Ex. 6 |
|---|---|---|---|
| Polymerization time | h | 1.7 | 1.7 |
| Yield | g | 3,030 | 3,036 |
| Solid content | % by weight | 0.6 | 0.6 |
| Proportion of carboxyl content | — | 0.29 | — |
| Second step |  |  |  |
| Dilution step with pure water (dilution of original solution with 50% by mass of pure water) | — | None | None |
| Neutralizing step with aqueous ammonia | — | None | None |
| Total amount of initiator | mg | 78 | 39 |
| Total amount of monomer mixture | g | 60 | 60 |
| Polymerization time | h | 4.2 | 3.0 |
| Yield | g | 229 | 228 |
| Solid content | % by mass | 23.5 | 24.0 |
| Average particle size of polymer | nm | 172 | 125 |
| Degree of polymer adhesion | — | 3 | 2 |

Example 7

(First Step)

Into a 6-liter stainless steel autoclave were poured 3.0 liter of pure water and 8.0 g of disodium hydrogenphosphate, 12-water, and the inside of a system was sufficiently replaced by nitrogen gas. After heating up to 94° C. with stirring at 600 rpm, a pressurized monomer mixture comprising vinylidene fluoride (VdF), tetrafluoroethylene (TFE) and hexafluoropropylene (HFP) (21/10/69 in a percent by mole ratio) was introduced so that the pressure inside the system would become 0.21 MPa. Then, a solution of polymerization initiator prepared by dissolving 1 g of ammonium persulfate (APS) in 5.5 ml of pure water was introduced with pressurized nitrogen gas to initiate reaction.

As the polymerization proceeded, when the inside pressure decreased to 0.19 MPa, a pressurized monomer mixture of VdF/TFE/HFP (50/20/30 in a percent by mole ratio) was introduced until the inside pressure reached 0.21 MPa. Thereafter, as polymerization reaction proceeded, the pressurized monomer mixture was introduced in the same manner as above, and increase and decrease of pressure were repeated nine times between 0.19 MPa and 0.21 MPa.

When the total amount of introduced monomer mixture reached 9 g, the stirring was stopped and the monomer mixture remaining in the polymerization reactor was discharged to stop the reaction. Then, the autoclave was cooled to room temperature, and 3,022 g of a dispersion was obtained.

The polymerization time required for the first step was 3.0 hours. The solid content of this dispersion was 0.7% by mass.

The fluorine-containing emulsified particles having carboxyl group in this dispersion was dissolved in THF. According to measurement by GPC, a number average molecular weight Mn of it was $1.4 \times 10^4$, its weight average molecular weight Mw was $2.4 \times 10^4$, and its molecular weight distribution Mw/Mn was 1.7. The results are shown in Table 4.

(Step for Reducing Polymerization Initiator)

The same treatment as in Example 1 was carried out.

(Second Step)

After charging 169 g each of dispersions subjected to the step for reducing polymerization initiator into a 0.5-liter stainless steel autoclave, the inside of a system was replaced by nitrogen gas. The autoclave was heated up to 80° C. with stirring at 875 rpm, and a pressurized monomer mixture of VdF/TFE/HFP (=22/11/67 in a percent by mole ratio) was introduced so that the inside pressure would become 1.55 MPa. Then, 1 g of 3.9% by mass aqueous solution of APS was introduced with pressurized nitrogen gas to initiate reaction.

As the polymerization proceeded, when the inside pressure decreased to 1.45 MPa, a pressurized monomer mixture of VdF/TFE/HFP (50/20/30 in a percent by mole ratio) was introduced until the inside pressure reached 1.55 MPa. Then, 0.255 g of pressurized 1,4-diiodoperfluorobutane was introduced. Thereafter, as polymerization reaction proceeded, only the monomer mixture was introduced in the same manner as above, and increase and decrease of pressure were repeated between 1.45 MPa and 1.55 MPa.

When the total amount of introduced monomer mixture reached 58 g, the autoclave was cooled to room temperature, and the monomer mixture was discharged, and the reaction was stopped to obtain each emulsion. Table 4 shows polymerization conditions and results of the second step, namely, whether treatment of the dispersion is conducted or not, a total amount of APS added, a total amount of introduced monomer mixture, polymerization time, yield, solid content, an average particle size of polymer and a degree of polymer adhesion. The degree of polymer adhesion is defined and evaluated as follows.

3: Polymer is not adhered to a stirrer blade, stirrer shaft, and side walls and bottom of polymerization reactor.

2: Polymer is slightly adhered to a stirrer blade, stirrer shaft, and side walls and bottom of polymerization reactor.

1: Polymer is remarkably adhered to a stirrer blade, stirrer shaft, and side walls and bottom of polymerization reactor.

Examples 8 to 9

Polymerization was carried out to obtain fluorine-containing emulsified particles (A) having ionic functional groups in the same manner as in Example 7 except that an amount of polymerization initiator APS and a polymerization pressure were changed as shown in Table 4. Increase and decrease in pressure was repeated within a range of ±0.01 MPa of the polymerization pressure. The results are shown in Table 4. The step for reducing polymerization initiator and the second step were carried out in the same manner as in Example 7.

TABLE 4

|  | Unit | Ex. 7 | Ex. 8 | Ex. 9 |
|---|---|---|---|---|
| First step |  |  |  |  |
| Pressure | MPa | 0.20 | 0.60 | 0.80 |
| Amount of APS added | g | 1.0 | 1.0 | 4.0 |
| Total amount of monomer mixture | g | 9 | 16 | 16 |
| Polymerization time | h | 3.0 | 0.4 | 0.1 |
| Yield | g | 3,022 | 3,022 | 3,025 |
| Solid content | % by weight | 0.7 | 0.7 | 0.9 |
| Proportion of carboxyl content | — | 0.41 | 0.14 | 0.17 |
| Number average molecular weight Mn | — | $1.4 \times 10^4$ | $1.9 \times 10^4$ | — |
| Weight average molecular weight Mw | — | $2.4 \times 10^4$ | $4.4 \times 10^4$ | — |
| Molecular weight distribution Mw/Mn | — | 1.7 | 2.4 | — |
| Second step |  |  |  |  |
| Dilution step with pure water (dilution of original solution with 50% by mass of pure water) | — | None | None | None |
| Neutralizing step with aqueous ammonia | — | None | None | None |
| Total amount of initiator added | mg | 39 | 39 | 39 |
| Total amount of monomer mixture | g | 58 | 53 | 51 |
| Polymerization time | h | 3.7 | 3.5 | 4.5 |
| Yield | g | 225 | 222 | 220 |
| Solid content | % by mass | 22.8 | 24.1 | 21.8 |
| Average particle size of polymer | nm | 223 | 175 | 167 |
| Degree of polymer adhesion | — | 3 | 3 | 3 |

Example 10

(First Step)

Into a 6-liter stainless steel autoclave were poured 3.0 liter of pure water and 8.0 g of disodium hydrogenphosphate 12-water, and the inside of a system was sufficiently replaced by nitrogen gas. After heating up to 94° C. with stirring at 600 rpm, a pressurized monomer mixture comprising vinylidene fluoride (VdF) and hexafluoropropylene (HFP) (60/40 in a percent by mole ratio) was introduced so that the pressure inside the system would become 0.21 MPa. Then, a solution of polymerization initiator prepared by dissolving 2 g of ammonium persulfate (APS) in 5.5 ml of pure water was introduced with pressurized nitrogen gas to initiate reaction.

As the polymerization proceeded, when the inside pressure decreased to 0.19 MPa, a pressurized monomer mixture of VdF/HFP (78/22 in a percent by mole ratio) was introduced until the inside pressure reached 0.21 MPa. Thereafter, as polymerization reaction proceeded, the pressurized monomer mixture was introduced in the same manner as above, and increase and decrease of pressure were repeated three times between 0.19 MPa and 0.21 MPa.

When the total amount of introduced monomer mixture reached 3 g, the stirring was stopped and the monomer mixture remaining in the polymerization reactor was discharged to stop the reaction. Then, the autoclave was cooled to room temperature, and 3,015 g of a dispersion was obtained.

The polymerization time required for the first step was 1.7 hours. The solid content of this dispersion was 0.3% by mass.

The surface tension SmLF of the obtained dispersion was 35 mN/m, and a difference ΔSm1 from the initial surface tension $Sm1_I$ was −37 mN/m.

The fluorine-containing emulsified particles having carboxyl group in this dispersion was dissolved in THF. According to measurement by GPC, a number average molecular weight Mn of it was $8.9 \times 10^2$, its weight average molecular weight Mw was $8.9 \times 10^2$, and its molecular weight distribution Mw/Mn was 1.

(Step for Reducing Polymerization Initiator)

The same treatment as in Example 1 was carried out.

(Second Step)

After charging 2,000 g of dispersion subjected to the step for reducing polymerization initiator into a 6-liter stainless steel autoclave, the inside of a system was replaced by nitrogen gas. The autoclave was heated up to 80° C. with stirring at 600 rpm, and a pressurized monomer mixture of VdF/TFE/HFP (=22/11/67 in a percent by mole ratio) was introduced so that the inside pressure would become 1.55 MPa. Then, a solution of polymerization initiator prepared by dissolving 47 mg of APS in 10 ml of pure water was introduced with pressurized nitrogen gas to initiate reaction.

As the polymerization proceeded, when the inside pressure decreased to 1.45 MPa, a pressurized monomer mixture of VdF/TFE/HFP (50/20/30 in a percent by mole ratio) was introduced until the inside pressure reached 1.55 MPa. Then, 3.06 g of pressurized 1,4-diiodoperfluorobutane was introduced. Thereafter, as polymerization reaction proceeded, only the pressurized monomer mixture was introduced in the same manner as above, and increase and decrease of pressure were repeated between 1.45 MPa and 1.55 MPa. In addition, 47 mg of APS was introduced under pressure 1, 3, 6 and 8 hours, respectively after starting of the polymerization.

When the total amount of introduced monomer mixture reached 664 g, the autoclave was cooled to room temperature, and the monomer mixture was discharged, and the reaction was stopped to obtain 2,651 g of an emulsion. The polymerization time required for the second step was ten hours.

The surface tension of the obtained emulsion was 68 mN/m, the solid content was 23.3% by mass, and the weight of fluorine-containing copolymer obtained throughout the first step and the second step was 618 g. The average particle size of the fluorine-containing copolymer particles was 33 nm.

This emulsion was taken out from the autoclave, and a weight of the polymer adhering to the side walls of the autoclave was measured. The weight was as small as 0.85 g.

Then, to the emulsion was added a 27% aqueous solution of $Al_2(SO_4)_3$ for coagulation, followed by washing with water, drying at 80° C. for six hours and then drying at 120°

C. for twelve hours to collect the fluorine-containing copolymer. According to NMR analysis, the copolymer was one comprising VdF, TFE and HFP in a percent by mole ratio of 53/22/25.

According to measurement by GPC, a number average molecular weight Mn of the fluorine-containing copolymer was $9.1 \times 10^4$, its weight average molecular weight Mw was $1.3 \times 10^5$, and its molecular weight distribution Mw/Mn was 1.4. A Mooney viscosity ML(1+10) of the dried fluorine-containing copolymer was 53 at 100° C. In this example, calculated weight of fluorine-containing emulsified particles (A) having carboxyl group prepared in the first step is 1.9% by mass based on the weight of finally obtained fluorine-containing copolymer (B) (The weight of the obtained fluorine-containing copolymer is 617 g. The weight of the emulsified particles is 2,000 g×0.003=6 g. From these, the proportion of the emulsified particles is 6 g/618 g×100=1.0% by mass. The emulsified particles mean those other than water which are contained in the fluorine-containing dispersion having ionic functional groups.).

In Example 10-1, to 100 phr of the obtained fluorine-containing copolymer were kneaded 20 phr of N990, 4 phr of TAIC and 1.5 phr of PERHEXA 25B with a mixing roll, and a composition for vulcanization was obtained. In Example 10-2, to 100 phr of the obtained fluorine-containing copolymer were kneaded 20 phr of N990, 2.0 phr of bisphenol AF, 0.6 phr of 8-benzyl-1,8-diazabicyclo[5,4,0]-7-undecenium chloride (hereinafter abbreviated to DBU-B), 3 phr of magnesium oxide and 6 phr of calcium hydroxide with a mixing roll, and a composition for vulcanization was obtained. Vulcanization characteristics of the compositions and physical properties after carrying out press vulcanization and then oven vulcanization are as shown in Table 5, and satisfactory characteristics were exhibited.

INDUSTRIAL APPLICABILITY

The present invention can provide a novel process for preparing a fluorine-containing polymer having a small number of ionic functional groups, in which emulsion polymerization proceeds stably and produced polymer does not adhere to side walls of a polymerization reactor even without using an emulsifying agent.

The invention claimed is:

1. A process for preparing a fluorine-containing polymer comprising
   a first step for preparing a dispersion comprising fluorine-containing emulsified particles (A) having ionic functional groups where a fluorine-containing monomer mixture (i) is polymerized by using a water soluble radical polymerization initiator (a) without addition of an emulsifying agent, and
   a second step for preparing a fluorine-containing polymer (B) having a small amount of ionic functional groups where fluorine-containing monomers (ii) are emulsion-polymerized by using a radical polymerization initiator (b) in the presence of said fluorine-containing emulsified particles (A) having ionic functional groups without addition of an emulsifying agent, and
   a step for reducing an amount of the water soluble radical polymerization initiator (a) remaining in a polymerization system after completion of the first step which comprises decomposing a polymerization initiator by treatment with activated carbon or decomposing a polymerization initiator by increasing temperature,
   said process being characterized in that:
   (1) the fluorine-containing monomer mixture (i) used in the first step is a monomer mixture comprising a perhalo ethylenic monomer and a nonperhalo ethylenic monomer,

TABLE 5

| | Unit | Ex. 10-1 | Ex. 10-2 |
|---|---|---|---|
| Fluorine-containing copolymer prepared in Example 10 | part by weight | 100 | 100 |
| N990 | part by weight | 20 | 20 |
| TAIC | part by weight | 4 | — |
| PERHEXA 25B | part by weight | 1.5 | — |
| Bisphenol AF | part by weight | — | 2.0 |
| DBU-B | part by weight | — | 0.6 |
| MgO | part by weight | — | 3 |
| Ca(OH)$_2$ | part by weight | — | 6 |
| Vulcanization characteristics | | | |
| Vulcanization temperature | ° C. | 160 | 170 |
| Minimum viscosity (ML) | Kgfcm | 0.52 | 1.14 |
| Degree of vulcanization (MH) | Kgfcm | 17.8 | 8.08 |
| Induction time (T$_{10}$) | min | 1.4 | 1.6 |
| Optimum vulcanization time (T$_{90}$) | min | 4.2 | 8.6 |
| Vulcanization conditions | | | |
| Press vulcanization | — | 160° C. × 10 min | 170° C. × 15 min |
| Oven vulcanization | — | 180° C. × 4 hrs | 230° C. × 24 hrs |
| Mechanical properties | | | |
| 100% modulus (M100) | MPa | 2.9 | 3.5 |
| Tensile strength at break (TB) | MPa | 19.8 | 11.9 |
| Tensile elongation at break (EB) | % | 325 | 350 |
| Hardness (Shore A, peak value) | — | 71 | 79 |
| Hardness (Shore A, 1 sec) | — | 68 | 74 |
| Compression set (CS) | | | |
| Conditions: 200° C. × 72 hrs | % | 29.2 | 44.4 |

(2) the fluorine-containing emulsified particles (A) having ionic functional groups prepared in the first step are used in an amount of from 0.01 to 5.0% by mass based on the fluorine-containing polymer (B) to be prepared in the second step, (3) an amount of the water soluble radical polymerization initiator (a) used in the first step is from 1.3 to 1,000% by mass based on the fluorine-containing emulsified particles (A) having ionic functional groups to be prepared in the first step, and (4) an emulsifying agent is not added through the first step and the second step, wherein the radical polymerization initiator (b) used in the second step is a water soluble radical polymerization initiator (b1).

2. The preparation process of claim 1, wherein said ionic functional groups are carboxyl group.

3. The preparation process of claim 1, comprising a step for adjusting a pH of the dispersion to be within a range from 3 to 11 after the first step and before the second step.

4. The preparation process of claim 1, wherein a monomer combination of the fluorine-containing monomer mixture (i) used in the first step is the same as that of the fluorine-containing monomers (ii) used in the second step.

5. The preparation process of claim 1, wherein a monomer combination of the fluorine-containing monomer mixture (i) of the first step is different from that of the fluorine-containing monomers (ii) of the second step.

6. The preparation process of claim 1, wherein a polymerization temperature in the first step is not less than 5° C.

7. The preparation process of claim 1, wherein a pressure of the monomer mixture (i) in the first step is maintained within a range from 0.05 to 3.0 MPa.

8. The preparation process of claim 1, wherein an amount of the perhalo ethylenic monomer in the monomer mixture (i) used in the first step is not less than 20% by mole.

9. The preparation process of claim 1, wherein an amount of the polymerization initiator used in the second step is within a range from 0.005 to 0.2% by mass based on the fluorine-containing polymer (B) to be prepared in the second step.

10. The preparation process of claim 1, wherein a difference $\Delta Sm1(=Sm1_I-Sm1_F)$ between the surface tension $Sm1_I$ of the polymerization system at the start of the first step and the surface tension $Sm1_F$ of the polymerization system at the completion of the first step is from −10 mN/m to −55 mN/m.

* * * * *